(12) United States Patent
Park et al.

(10) Patent No.: US 8,512,008 B2
(45) Date of Patent: Aug. 20, 2013

(54) OIL SUPPLY SYSTEM OF AUTOMATIC TRANSMISSION

(75) Inventors: Jongsool Park, Hwaseong-si (KR);
Jinyoung Hwang, Suwon-si (KR);
Wonjune Sung, Seoul (KR)

(73) Assignee: Hyundai Motor Company, Seoul (KR)

( * ) Notice: Subject to any disclaimer, the term of this patent is extended or adjusted under 35 U.S.C. 154(b) by 372 days.

(21) Appl. No.: 12/954,235

(22) Filed: Nov. 24, 2010

(65) Prior Publication Data
US 2012/0085441 A1 Apr. 12, 2012

(30) Foreign Application Priority Data
Oct. 12, 2010 (KR) .......................... 10-2010-0099188

(51) Int. Cl.
*F04B 25/00* (2006.01)

(52) U.S. Cl.
USPC ............................ 417/250; 417/304; 417/308

(58) Field of Classification Search
USPC ................. 417/250, 253, 286, 288, 302, 304, 417/307, 308, 244, 247; 192/85.61, 85.63; 60/456, 486
See application file for complete search history.

(56) References Cited

U.S. PATENT DOCUMENTS

| | | | | |
|---|---|---|---|---|
| 4,347,044 A | * | 8/1982 | Ahlen et al. | 417/253 |
| 5,839,412 A | * | 11/1998 | Stockner et al. | 123/446 |
| 6,196,806 B1 | | 3/2001 | Van Der Sluis | |
| 7,281,904 B2 | * | 10/2007 | Schultz et al. | 417/79 |
| 2007/0098567 A1 | * | 5/2007 | Johnson et al. | 417/199.1 |
| 2009/0232673 A1 | * | 9/2009 | Reisch et al. | 417/364 |

FOREIGN PATENT DOCUMENTS

| | | |
|---|---|---|
| JP | 7-54981 A | 2/1995 |
| JP | 7-190157 A | 7/1995 |
| JP | 11-37242 A | 2/1999 |
| JP | 2005-315271 A | 11/2005 |
| JP | 2005-321024 A | 11/2005 |
| JP | 2009-270649 A | 11/2009 |
| KR | 10-2008-0011285 A | 2/2008 |

* cited by examiner

Primary Examiner — Peter J Bertheaud
Assistant Examiner — Dnyanesh Kasture
(74) Attorney, Agent, or Firm — Morgan, Lewis & Bockius LLP

(57) ABSTRACT

An oil supply system of an automatic transmission includes a first oil pump pumping up oil from the oil reservoir and supplying the oil to the low-pressure part, a low-pressure regulating valve connected to a low-pressure part channel connecting the first oil pump with the low-pressure part, and controlling the pressure of the oil discharged from the first oil pump at pressure required by the low-pressure part, a second oil pump receiving the oil of which the pressure is controlled through the low-pressure regulating valve and supplying the oil to the high-pressure part, and a high-pressure regulating valve connected to a high-pressure part channel connecting the second oil pump with the high-pressure part and controlling the pressure of the oil discharged from the second oil pump at pressure required by the high-pressure part.

12 Claims, 3 Drawing Sheets

OIL SUPPLY SYSTEM OF AUTOMATIC TRANSMISSION

CROSS-REFERENCE TO RELATED APPLICATIONS

The present application claims priority to Korean Patent Application Number 10-2010-0099188 filed Oct. 12, 2010, the entire contents of which application is incorporated herein for all purposes by this reference.

BACKGROUND OF THE INVENTION

1. Field of the Invention

The present invention relates to an oil supply system of an automatic transmission, and more particularly, to an oil supply system of an automatic transmission that supply oil from an oil reservoir to a high-pressure part for operating a clutch and to a low-pressure part for cooling and lubricating, using an oil pump.

2. Description of Related Art

As the oil price increases and the regulation for exhaust gas ($CO_2$) is enhanced over the world in recent years, it is very important to improve fuel efficiency and consider eco-friendly factors in developing vehicles and the advanced car manufacturers have devoted all their strength to come up with technologies for saving fuel in order to achieve those objects.

Improving power transmission efficiency the transmission is necessary to improve fuel efficiency in automatic transmission vehicles, but the oil pump in the automatic transmission is a part reducing the power transmission efficiency, such that the power transmission efficiency of the transmission can be considerably increased, if unnecessary power consumption of the oil pump can be reduced.

The output flow rate of the oil pump is composed of the flow rate of the high-pressure part for operating the clutch, the flow rate of the low-pressure part for cooling and lubricating, and the recirculation flow rate returning the flow rate left after generating desired oil pressure from a regulating valve to the inlet of the oil pump, however, the oil supply systems discharges the entire oil on the basis of the high-pressure part used to control the clutch in the related art, such that the oil pump consumes a large amount of power and accordingly the power transmission efficiency of transmissions is reduced.

That is, according to an oil supply system of the related art, as shown in FIG. 1, an inlet 1a of an oil pump 1 is connected with an oil reservoir 3 through an oil supply channel 2, an outlet 1b of oil pump 1 is connected to a high-pressure part 5 for operating a clutch through a high-pressure part channel 4, high-pressure channel 4 is connected with a high-pressure regulating valve 8 and a reducing valve 9 through a first valve channel 6 and a second valve channel 7, respectively, reducing valve 9 is connected to a low-pressure part 11 for cooling and lubricating through a low-pressure part channel 10, and high-pressure regulating valve 8 and reducing valve 9 are connected with oil supply channel 2 through a first return channel 12 and a second return channel 13, respectively.

In this configuration, oil 14 in oil reservoir 3 is supplied to inlet 1a of oil pump 1 through oil filter 15 and oil pump 1 is operated by power from an engine 16.

Therefore, as oil pump 1 is operated by the power from engine 16, oil 14 in oil reservoir 3 flows into inlet 1a and the oil discharged from outlet 1b to high-pressure part channel 4 is controlled at high pressure by high-pressure regulating valve 8 and supplied to high-pressure part 5.

Some of the oil in high-pressure part channel 4 is supplied to reducing valve 9 through second valve channel 7, reducing valve 9 reduces high pressure of the oil to low pressure, and the oil at the low pressure reduced by reducing valve 9 is supplied to low-pressure part 11.

Further, the oil left from the oil increased in pressure by high-pressure regulating valve 8 recirculates to inlet 1a of oil pump 1 through first return channel 12 and oil supply channel 2 and the oil left from the oil decreased in pressure by reducing valve 9 recirculates to inlet 1a of oil pump 1 through second return channel 13 and oil supply channel 2.

In general, since low-pressure part 11 is used to cooling and lubricating the transmission, it needs a lot of flow rate, while since high-pressure part 5 is used to control the clutch, it needs a smaller amount of flow rate than low-pressure part 11.

Therefore, according to the oil supply system having the configuration of the related art, oil pump 1 discharges the entire flow rate on the basis of high-pressure part 5, such that oil pump 1 requires a large amount power. For example, assuming that high-pressure part 5 requires pressure of 20 $kgf/cm^2$ and flow rate of 5 lpm, low-pressure part 11 requires pressure of 8 $kgf/cm^2$ and flow rate 10 lpm, and the recirculation flow rate is 15 lpm, the consuming power of oil pump 1 of the system according to the related art is defined by "consuming power=high-pressure part pressure×entire discharged amount", and substituting values in the equation, "20 $kgf/cm^2$×30 lpm=980 W", that is, the consuming power of oil pump 1 is 980 W.

The consuming power 980 W of oil pump 1 is relatively large and the large consuming power of oil pump 1, as described above, considerably reduces the power transmission efficiency of the transmission, such that the fuel efficiency of the vehicle reduces. Further, excessive load is applied to oil pump 1, such that durability of oil pump 1 is reduced and large noise is caused. Pressure vibration is excessively generated by cavitation when oil pump 1 operates at high speed.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide an oil supply system of an automatic transmission that has an improved configuration by making the oil pump discharge the entire flow rate on the basis of a low-pressure part for cooling and lubricating and controlling the pressure of only some of the oil for a high-pressure part at high pressure and then supplying the oil to the high-pressure part, to reduce a large amount of power consumed by the oil pump, improves fuel efficiency by largely improving power transmission efficiency of the transmission, and improves durability and reduces noise and pressure vibration by reducing the load applied to the oil pump.

One aspect of the present invention provides an oil supply system of an automatic transmission which supplies oil from an oil reservoir to a high-pressure part and a low-pressure part, using an oil pump, and includes a first oil pump pumping up oil from the oil reservoir and supplying the oil to the low-pressure part, a low-pressure regulating valve connected to a low-pressure part channel connecting the first oil pump with the low-pressure part, and controlling the pressure of the oil discharged from the first oil pump at pressure required by the low-pressure part, a second oil pump receiving the oil of which the pressure is controlled through the low-pressure regulating valve and supplying the oil to the high-pressure part, and a high-pressure regulating valve connected to a high-pressure part channel connecting the second oil pump with the high-pressure part and controlling the pressure of the oil discharged from the second oil pump at pressure required by the high-pressure part.

Further, the oil supply system of an automatic transmission further includes a first return channel recirculating the oil left after generating the low-pressure oil through the low-pressure regulating valve to the inlet of the first oil pump, a second return channel recirculating the oil left after generating the high-pressure oil through the high-pressure regulating valve to the inlet of the second oil pump, a connection channel connecting the low-pressure part channel with the high-pressure part channel, and a one-way check valve allowing for oil flow from the low-pressure part channel to the high-pressure part channel and preventing oil flow in the opposite direction.

Another aspect of the present invention provides an oil supply system of an automatic transmission which supplies oil from an oil reservoir to a high-pressure part and a low-pressure part, using an oil pump, and includes a first oil pump pumping up oil from the oil reservoir and supplying the oil to the low-pressure part, a low-pressure regulating valve connected to a low-pressure part channel connecting the first oil pump with the low-pressure part, and controlling the pressure of the oil discharged from the first oil pump at pressure required by the low-pressure part, a second oil pump receiving the oil of which the pressure is controlled through the low-pressure regulating valve and supplying the oil to the high-pressure part, a high-pressure regulating valve connected to a high-pressure part channel connecting the second oil pump with the high-pressure part and controlling the pressure of the oil discharged from the second oil pump at pressure required by the high-pressure part, a first return channel recirculating the oil left after generating the low-pressure oil through the low-pressure regulating valve to the inlet of the first oil pump, and a second return channel recirculating the oil left after generating the high-pressure oil through the high-pressure regulating valve to the inlet of the first oil pump.

Further, the oil supply system of an automatic transmission further includes a connection channel connecting the low-pressure part channel with the high-pressure part channel, and a one-way check valve disposed in the connection channel to allow for oil flow from the low-pressure part channel to the high-pressure part channel and prevent oil flow in the opposite direction.

According to various aspects of the present invention, an oil supply system of an automatic transmission can remarkably reduce the total consuming power of oil pumps, by discharging the entire oil on the basis of a low-pressure part and controlling only some of the oil, which is required by a high-pressure part, at high pressure, and then supplying the oil to high-pressure part, can considerably improve power transmission efficiency of the transmission, and can improve fuel efficiency and durability of the oil pumps and reduce loss of power, noise, and pressure vibration.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
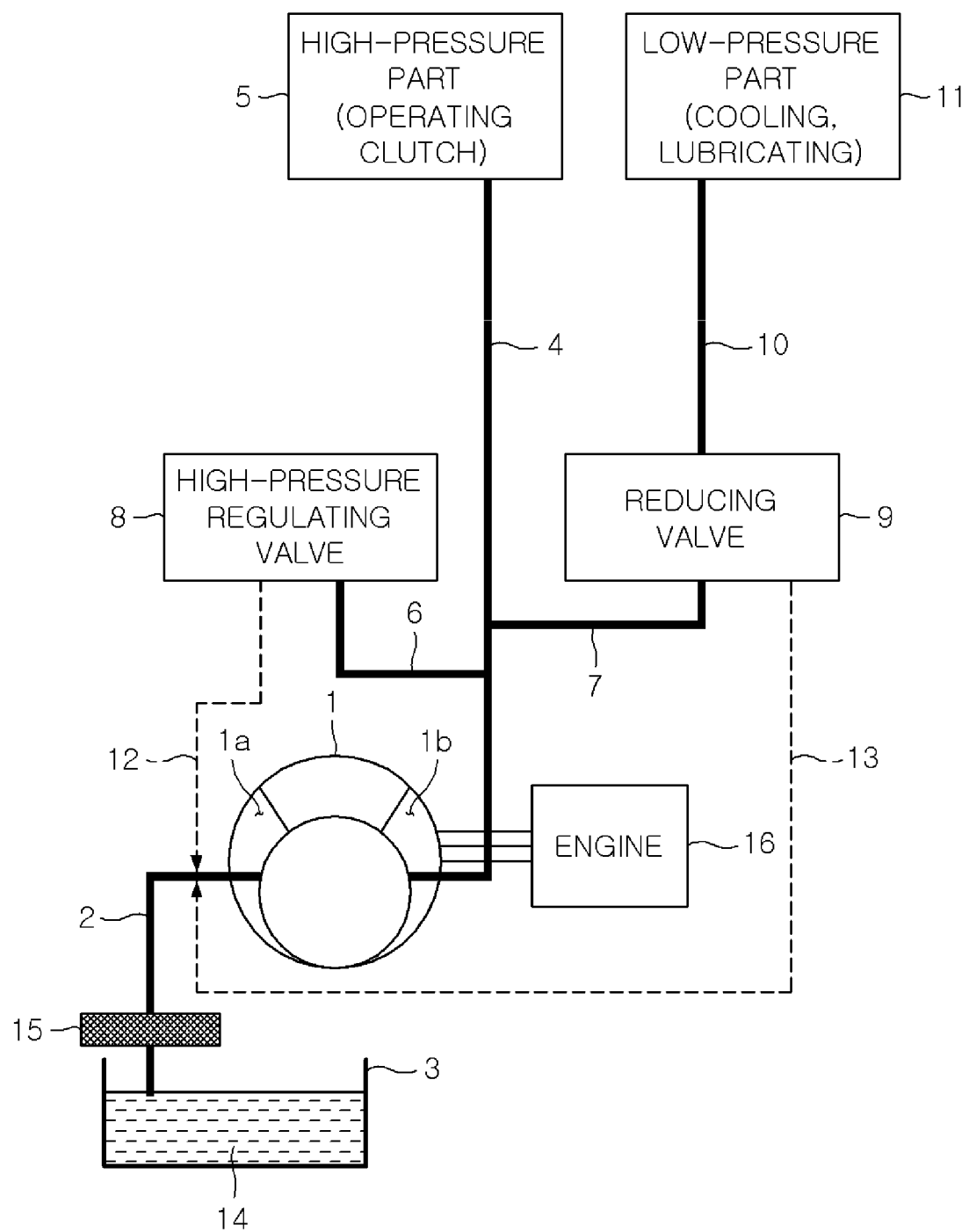
FIG. 1 is a diagram illustrating an oil supply system of an automatic transmission of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
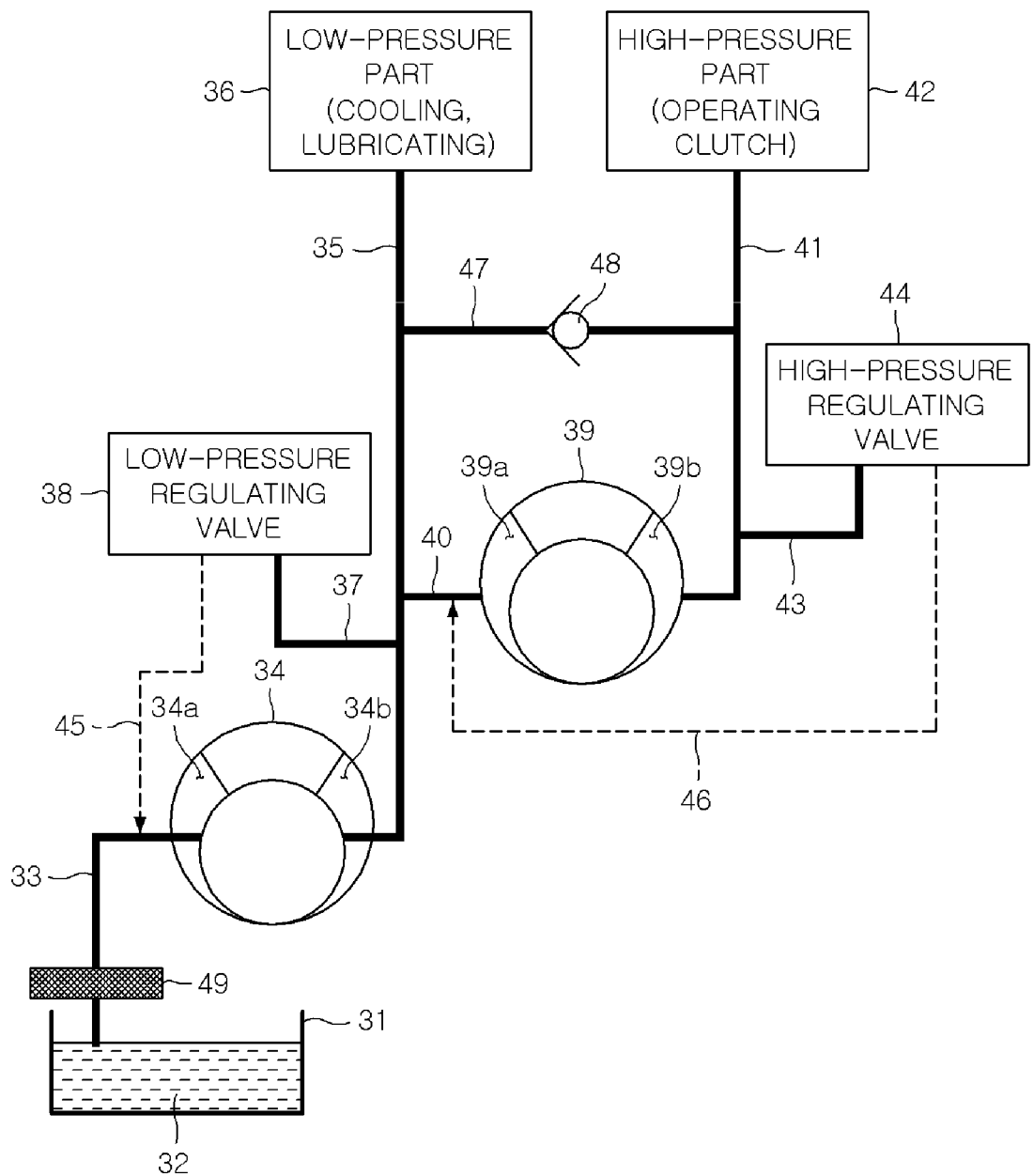
FIG. 2 is a diagram illustrating an exemplary oil supply system of an automatic transmission according to the present invention.

FIG. 2 shows an oil supply system according to various embodiments of the present invention, where oil 32 is stored in an oil reservoir 31, oil reservoir 31 is connected with an inlet 34a of a first oil pump 34 through an oil supply channel 33, outlet 34b of first oil pump 34 is connected to a low-pressure part 36 for cooling and lubricating through a low-pressure part channel 35, a low-pressure regulating valve 38 is connected to low-pressure part channel 35 through a first valve channel 37, such that low-pressure regulating valve 38 controls the pressure of oil discharged to low-pressure part channel 35 from outlet 34b of first oil pump 34 at a level required by low-pressure part 36.

Further, a sub-channel 40 diverging from low-pressure part channel 35 to supply the oil of which the pressure is controlled through low-pressure regulating valve 38 to a second oil pump 39 is connected with inlet 39a of second oil pump 39, an outlet 39b of second oil pump 39 is connected to a high-pressure part 42 for operating a clutch through a high-pressure part channel 41, and a high-pressure regulating valve 44 is connected to high-pressure part channel 41 through a second valve channel 43, such that high-pressure regulating valve 44 controls the pressure of the oils discharged to high-pressure channel 41 from outlet 39b of second oil pump 39 at a level (high pressure) required by high-pressure part 42.

The oil supply system according to various embodiments of the present invention includes a first return channel 45 connecting an oil intake channel 33 with low-pressure regulating valve 38 to recirculate the oil left after generating the low-pressure oil through low-pressure regulating valve 38 to inlet 34a of first oil pump 34, and a second return channel 46 connecting sub-channel 40 with high-pressure regulating valve 44 to recirculate the oil left after generating the high-pressure oil through high-pressure regulating valve to inlet 39a of second oil pump 39.

Further, the oil supply system according to various embodiments of the present invention further includes a connection channel 47 that connects low-pressure part channel 35 with high-pressure part channel 41, and a one-way check valve 48 that allows for oil flow from low-pressure part channel 35 to high-pressure part channel 41 and prevents oil flow in the opposite direction is disposed in connecting channel 47.

In this configuration, one end of connecting channel 47 is connected with the line between low-pressure regulating valve 38 and low-pressure part 36 in low-pressure part channel 35, while the other end is connected with the line between high-pressure regulating valve 44 and high-pressure part 42 in high-pressure part channel 41.

Further, one-way check valve 48 is a valve opening connection channel 47, only when the oil pressure of high-pressure part channel 41 is lower than the oil pressure of low-pressure part channel 35.

Sometimes, the pressure of the high-pressure part may need to be lower than the pressure of the low-pressure part while the vehicle travels under small load, in which second oil pump 39 stops and the oil is supplied from low-pressure part 35 to high-pressure part 42 through connection channel 47 and high-pressure part channel 41 by one-way check valve 48.

If the vehicle travels under high load (traveling at high speed, accelerating, traveling on a slope, or shifting etc.), the high-pressure part 42 requires high-pressure oil, because large load is applied thereto, in which second oil pump 39 and high-pressure regulating valve 44 operate.

Accordingly, the oil pressure of high-pressure part channel 41 increases larger than the oil pressure of low-pressure part channel 35, such that one-way check valve 48 is kept closed. Therefore, the connection channel 47 connecting low-pressure part channel 35 with high-pressure part channel 41 is closed by one-way check valve 48, and low-pressure oil and high pressure oil start to be supplied to low-pressure part 36 and high-pressure part 42, respectively.

Further, the low-pressure part oil is supplied through one-way check valve 48 in a failsafe condition in which second oil pump 39 fails to normally operate, thereby implementing emergency operation.

According to various embodiments of the present invention, both of first oil pump 34 and second oil pump 39 may be mechanical oil pumps that are operated by power from an engine.

Alternatively, first oil pump 34 may be a mechanical oil pump that is operated by the power from an engine and second oil pump 39 may be an electric oil pump that is operated by power from an electric motor.

In this case, the electric motor is operated by electric signals from an oil pump control unit, and the parameters that are inputted to the oil pump control unit to control the operation of the electric motor may be the number of revolution (rpm) of the engine, engine torque, vehicle speed, shifting, oil temperature etc.

Alternatively, according to various embodiments of the present invention, both of first oil pump 34 and second oil pump 39 may be electric oil pumps that are operated by power from an electric motor.

The operation of the oil supply system according to various embodiments of the present invention is described hereafter.

Oil 32 in oil reservoir 31 flows into inlet 34a of first oil pump 34 through an oil filter 49 by the operation of first oil pump 34.

The oil discharged to low-pressure part channel 35 through outlet 34b of first oil pump 34 decreases in pressure by low-pressure regulating valve 38 and then supplied to low-pressure part 36.

Further, the oil left after generating the low-pressure oil through low-pressure regulating valve 38 recirculates to inlet 34a of first oil pump 34 through first return channel 45 and oil supply channel 33.

Further, some of the low-pressure oil generated through low-pressure regulating valve 38 is supplied to inlet 39a of second oil pump 39 through sub-channel 40 while the low-pressure oil discharged to high-pressure part channel 41 through outlet 39b of second oil pump 39 is controlled at the pressure (high pressure) required by high-pressure part 42 by high-pressure regulating valve 44 and then supplied to high-pressure part 42.

Further, the oil left after generating the high-pressure oil through high-pressure regulating valve 44 recirculates to inlet 39a of second oil pump 39 through second return channel 46 and sub-channel 40.

Since low-pressure part 36 is used to cooling and lubricating the transmission, it needs a lot of flow rate, while since high-pressure part 42 is used to control the clutch, it needs a smaller amount of flow rate than low-pressure part 36.

Therefore, since the entire oil is discharged on the basis of low-pressure part 36 and only some of the oil which is required by high-pressure part 42 is controlled at high pressure and supplied to high-pressure part 42 in the oil supply system according to various embodiments of the present invention the power consumed by the oil pump is largely reduced as compared with the configuration of the related art, which is shown in FIG. 1.

That is, assuming that, as in the example of the related art, high-pressure part 42 needs pressure of 20 $kgf/cm^2$ and flow rate of 5 lpm, low-pressure part 36 needs pressure of 8 $kgf/cm^2$ and flow rate of 10 lpm, and the recirculation flow rate is 15 lpm, the total consuming power of first and second oil pumps 34, 39 of the present invention is defined by "consuming power={[pressure of low-pressure part×entire discharged amount]+[pressure of high-pressure part−pressure of low-pressure part]×discharged amount of high-pressure part}.

Substituting values into the equation, "{[8 $kgf/cm^2$×30 lpm]+[(20 $kgf/cm^2$−8 $kgf/cm^2$)×5 lpm]}=490 W", that the total consuming power of first and second oil pumps 34, 39 of the present invention is 490 W, such that it is possible to reduce approximately 50% of the consuming power, 980 W, of the oil pump of the related art, which has been described with reference to FIG. 1.

As the total consuming power of the oil pumps is remarkably reduced by the configuration of the present invention, the factors reducing power transmission efficiency of a transmission is considerably decreased, such that the power transmission efficiency of the transmission is largely improved and the fuel efficiency can be further improved.

Further, as the total consuming power of the oil pumps reduces, the load exerted in the oil pumps can be decreased, such that it is possible to improve durability of the oil pumps and reduce noise and pressure vibration.

Figure 3:
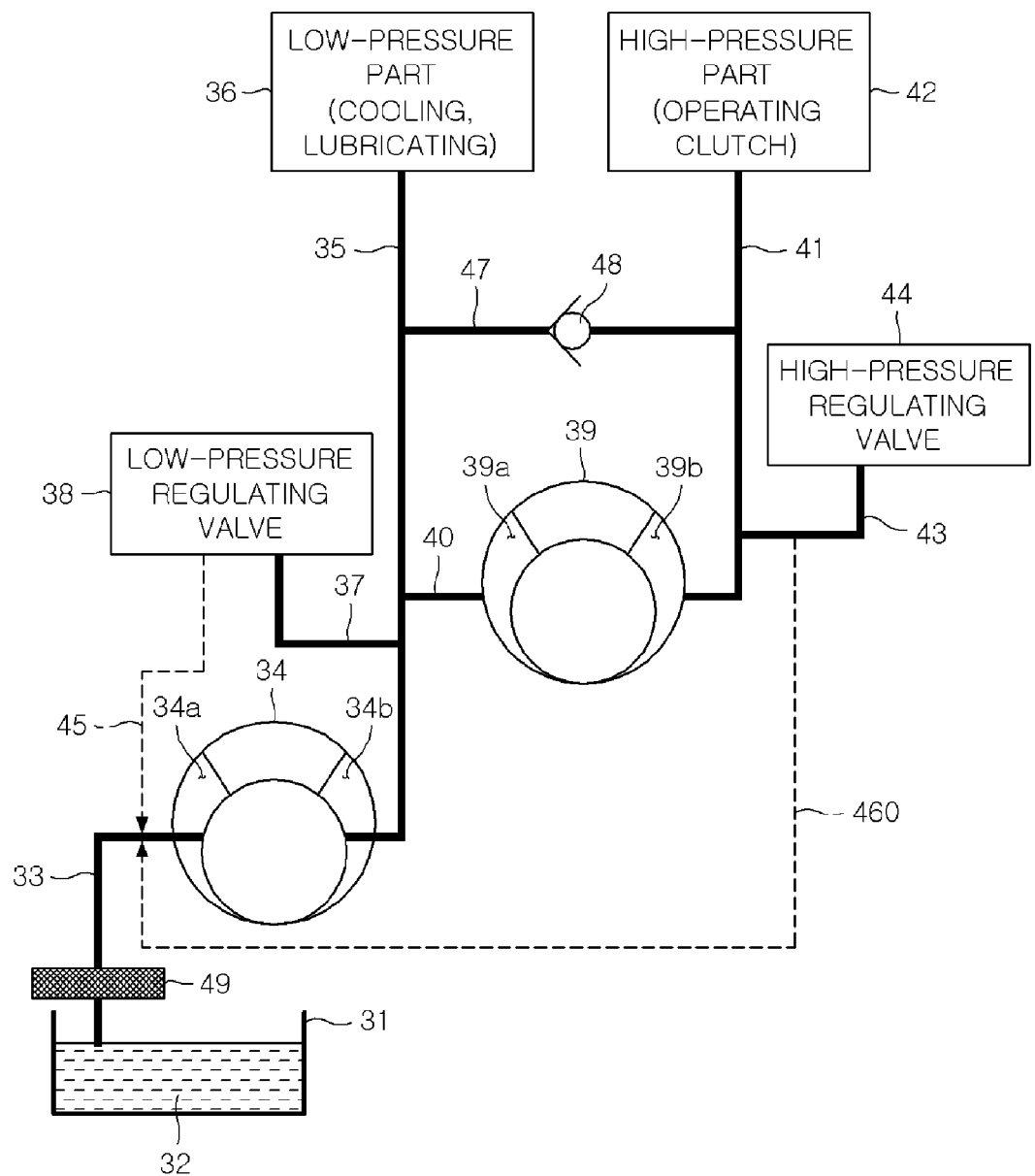
FIG. 3 is a diagram illustrating an exemplary oil supply system of an automatic transmission according to the present invention.

FIG. 3 shows an oil supply system according to various embodiments of the present invention. Comparing the configuration shown in FIG. 3 with the configuration shown in FIG. 2, it is different that a second return channel 460 is connected to an oil supply channel 33 to recirculate the oil left after generating high-pressure oil through a high-pressure regulating valve 44 to an inlet 34a of a first oil pump 34, and the others are all the same as those shown in FIG. 2.

Therefore, in the configuration shown in FIG. 3, the entire oil is discharged on the basis of a low-pressure part 36 and only some of the oil which is required by a high-pressure part 42 is controlled at high pressure and then supplied to high-pressure part 42, as in that shown in FIG. 2. Accordingly, the total consuming power of the oil pumps can be considerably reduced, as compared with the configuration of the related art shown in FIG. 1, and the detailed description is not provided.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil supply system of an automatic transmission which supplies oil from an oil reservoir to a high-pressure part and a low-pressure part, the oil supply system comprising:
    a first oil pump pumping up oil from the oil reservoir and supplying the oil to the low-pressure part;
    a low-pressure regulating valve connected to a low-pressure part channel through a first valve channel, and controlling an oil pressure discharged from the first oil pump at a first pressure required by the low-pressure part wherein the low-pressure part channel connects the first oil pump with the low-pressure part;
    a sub-channel branching from the low pressure part channel to a high-pressure part channel connected to the high pressure part, wherein the first valve channel is disposed upstream of the sub-channel;
    a second oil pump disposed between the sub-channel and the high pressure part channel and receiving the oil of which the first pressure is controlled by the low-pressure regulating valve and supplying the oil to the high-pressure part; and
    a high-pressure regulating valve connected to the high-pressure part channel connecting the second oil pump with the high-pressure part and controlling an oil pressure discharged from the second oil pump at a second pressure required by the high-pressure part;
    a connection channel connecting the low-pressure part channel with the high-pressure part channel; and
    a one-way check valve disposed in the connection channel to allow for oil flow from the low-pressure part channel to the high-pressure part channel and prevent oil flow in the opposite direction;
    wherein one end of the connection channel is connected to the low-pressure part channel, and the other end of the connection channel is connected to the high-pressure part channel;
    wherein the one-way check valve is a valve opening the connection channel, only when the oil pressure of the high-pressure part channel is lower than the oil pressure of the low-pressure part channel, in a state of stopping the second oil pump.

2. The oil supply system of an automatic transmission as defined in claim 1, further comprising a first return channel recirculating the oil through the low-pressure regulating valve to an inlet of the first oil pump.

3. The oil supply system of an automatic transmission as defined in claim 2, further comprising a second return channel recirculating the oil through the high-pressure regulating valve to an inlet of the second oil pump.

4. The oil supply system of an automatic transmission as defined in claim 1, further comprising an oil pump control unit generating control signals to stop the second oil pump, when the oil pressure of the high-pressure part channel is lower than the low-pressure part channel.

5. The oil supply system of an automatic transmission as defined in claim 1, wherein the first oil pump and the second oil pump are both mechanical oil pumps that are operated by power from an engine.

6. The oil supply system of an automatic transmission as defined in claim 1, wherein the first oil pump is a mechanical oil pump that is operated by power from an engine, and
    the second oil pump is an electric oil pump that is operated by power from an electric motor.

7. The oil supply system of an automatic transmission as defined in claim 1, wherein the first oil pump and the second oil pump are both electric oil pumps that are operated by power from an electric motor.

8. An oil supply system of an automatic transmission which supplies oil from an oil reservoir to a high-pressure part and a low-pressure part, the oil supply system comprising:
    a first oil pump pumping up oil from the oil reservoir and supplying the oil to the low-pressure part;
    a low-pressure regulating valve connected to a low-pressure part channel through a first valve connecting the first oil pump with the low-pressure part, and controlling an oil pressure discharged from the first oil pump at a first pressure required by the low-pressure part;
    a sub-channel branching from the low pressure part channel to a high-pressure part channel connected to the high-pressure part, wherein the first valve channel is disposed upstream of the sub-channel;
    a second oil pump disposed between the sub-channel and the high-pressure part channel and receiving the oil of which the first pressure is controlled through the low-pressure regulating valve and supplying the oil to the high-pressure part;
    a high-pressure regulating valve connected to a high-pressure part channel connecting the second oil pump with the high-pressure part and controlling an oil pressure discharged from the second oil pump at a second pressure required by the high-pressure part;
    a first return channel recirculating the oil through the low-pressure regulating valve to an inlet of the first oil pump;
    a second return channel recirculating the oil through the high-pressure regulating valve to the inlet of the first oil pump; and
    a connection channel connecting the low-pressure part channel with the high-pressure part channel; and a one-way check valve disposed in the connection channel to allow for oil flow from the low-pressure part channel to the high-pressure part channel and prevent oil flow in the opposite direction;
    wherein one end of the connection channel is connected to the low-pressure part channel, and the other end of the connection channel is connected to the high-pressure part channel; and
    wherein the one-way check valve is a valve opening the connection channel, only when the oil pressure of the high-pressure part channel is lower than the oil pressure of the low-pressure part channel in a state of stopping the second oil pump.

9. The oil supply system of an automatic transmission as defined in claim 8, further comprising an oil pump control unit generating control signals to stop the second oil pump, when the oil pressure of the high-pressure part channel is lower than the low-pressure part channel.

10. The oil supply system of an automatic transmission as defined in claim 8, wherein the first oil pump and the second oil pump are both mechanical oil pumps that are operated by power from an engine.

11. The oil supply system of an automatic transmission as defined in claim 8, wherein the first oil pump is a mechanical oil pump that is operated by power from an engine, and
   the second oil pump is an electric oil pump that is operated by power from an electric motor.

12. The oil supply system of an automatic transmission as defined in claim 8, wherein the first oil pump and the second oil pump are both electric oil pumps that are operated by power from an electric motor.

* * * * *